United States Patent [19]

Humble et al.

[11] Patent Number: 5,063,028
[45] Date of Patent: Nov. 5, 1991

[54] PROCESS AND APPARATUS FOR REGENERATION OF FCC CATALYST

[75] Inventors: John D. Humble, Asheville, N.C.; Raymond C. Searles, Flemington, N.J.; John D. Ruggles, Surrey, England; Judah L. Jacobowitz, Princeton, N.J.

[73] Assignee: Mobil Oil Corporation, Fairfax, Va.

[21] Appl. No.: 525,503

[22] Filed: May 18, 1990

[51] Int. Cl.⁵ .................... F27B 15/04; F27B 15/06; B01J 8/28; B01J 8/34
[52] U.S. Cl. .................... 422/144; 110/245; 110/336; 122/40; 220/470; 220/435; 248/901; 422/240; 422/241
[58] Field of Search ............ 422/139, 144, 240, 241; 248/DIG. 1; 220/470, 435; 110/336, 245; 122/4 D; 165/104.16

[56] References Cited

U.S. PATENT DOCUMENTS

| | | | |
|---|---|---|---|
| 2,852,444 | 9/1958 | Spencer | 422/139 X |
| 3,460,785 | 8/1969 | Abidi | 422/143 |
| 3,484,212 | 12/1969 | Venable, Jr. et al. | 422/310 X |
| 4,490,334 | 12/1984 | Peterson | 422/241 |
| 4,493,816 | 1/1985 | Becker et al. | 422/144 X |

OTHER PUBLICATIONS

*Fluid Catalytic Cracking Report*, Oil & Gas Journal, Jan. 3, 1990, Avidan et al., p. 33.

*Primary Examiner*—Robert J. Warden
*Assistant Examiner*—Amaha Santiago
*Attorney, Agent, or Firm*—Alexander J. McKillop; Charles J. Speciale; Richard D. Stone

[57] ABSTRACT

Reduced thermal overstressing and cracking in the cone of a high efficiency regenerator for fluidized catalytic cracking catalyst is achieved by providing a cylindrical skirt at the base of the cone. The skirt defines an annular space which allows for expansion of the cone during changes in temperature of the regenerator. A catalytic cracking process using the regenerator is also disclosed.

10 Claims, 3 Drawing Sheets

PROCESS AND APPARATUS FOR REGENERATION OF FCC CATALYST

BACKGROUND OF THE INVENTION

1. Field of the Invention

The invention relates to protecting metal membrane seals in FCC regenerators from thermal stress, and to a catalytic cracking process using such regenerators.

2. Description of the Related Art

In the fluidized catalytic cracking (FCC) process, catalyst, having a particle size and color resembling table salt and pepper, circulates between a cracking reactor and a catalyst regenerator. In the reactor, hydrocarbon feed contacts a source of hot, regenerated catalyst. The hot catalyst vaporizes and cracks the feed at 425° C.-600° C., usually 460° C.-560° C. The cracking reaction deposits carbonaceous hydrocarbons or coke on the catalyst, thereby deactivating the catalyst. The cracked products are separated from the coked catalyst. The coked catalyst is stripped of volatiles, usually with steam, in a catalyst stripper and the stripped catalyst is then regenerated. The catalyst regenerator burns coke from the catalyst with oxygen containing gas, usually air. Decoking restores catalyst activity and simultaneously heats the catalyst to, e.g., 500° C.-2900° C., usually 600° C.-750° C. This heated catalyst is recycled to the cracking reactor to crack more fresh feed. Flue gas formed by burning coke in the regenerator may be treated for removal of particulates and for conversion of carbon monoxide, after which the flue gas is normally discharged into the atmosphere.

Catalytic cracking has undergone progressive development since the 40s. The trend of development of the fluid catalytic cracking (FCC) process has been to all riser cracking and use of zeolite catalysts. A good overview of the importance of the FCC process, and its continuous advancement, is reported in Fluid Catalytic Cracking Report, Amos A. Avidan, Michael Edwards and Hartley Owen, as reported in the Jan. 8, 1990 edition of the Oil & Gas Journal.

Modern catalytic cracking units use active zeolite catalyst to crack the heavy hydrocarbon feed to lighter, more valuable products. Instead of dense bed cracking, with a hydrocarbon residence time of 20-60 seconds, much less contact time is needed. The desired conversion of feed can now be achieved in much less time, and more selectively, in a dilute phase, riser reactor.

Similar advancements have been made in the FCC regenerator. Most new FCC units now use a high efficiency regenerator (H.E.R.), characterized by a fast fluidized bed coke combustor, a dilute phase transport riser mounted above the coke combustor, and a second dense bed, for collection of regenerated catalyst for recycle to the reactor and frequently for recycle to the coke combustor as well. Such regenerators are now widely used, because they allow FCC units to operate with roughly half the catalyst required when using a prior art, bubbling dense bed regenerator. These units do have some mechanical problems.

The H.E.R. design is generally "stacked", that is, the coke combustor comprises the base of the unit, the transport riser is mounted directly above the coke combustor, usually via a cone or dome shaped transition section, and the second dense bed of catalyst forms around the transport riser, usually over the cone shaped transition section.

The cone or dome shaped transition is subject to extreme thermal stress during operation of the FCC unit. The transition section must be strong, to support itself and a large, bubbling dense phase fluidized bed of catalyst. It must also be sealed, to isolate the fast fluidized bed region from the second dense bed region, and usually must be lined with a refractory material to withstand erosion.

The cone or dome shape is inherently strong, much stronger than a typical grid floor, because arches and domes are stronger than post and lintel construction. The cone or dome is also rigid, due partly to its shape and greatly to the refractory lining which must be added to withstand years of sandblasting in the FCC unit. This strength and rigidity makes it very difficult to reliably seal the cone or dome to the top of the coke combustor. The cone expands and contracts at a different rate than the other parts of the regenerator, and many times deformation and cracks develop which require shutdown and dismantling of the regenerator. This is expensive not only from the point of view of lost production, but also from the cost of repairs, which can and do cost millions of dollars, because of the large size of the vessels involved.

We knew there had to be a better way to seal a cone to a generally cylindrical pressure vessel than just welding the cone to the cylinder. We reviewed the technology available on sealing metal membranes in FCC units and found nothing that was directly applicable or completely satisfactory. Perhaps the closest was U.S. Pat. No. 4,493,816, Insulation System for Process Vessel, which is incorporated herein by reference. This patent recognized the problem of sealing a grid floor, lined with refractory material, to a process vessel wall in a manner such that expansion of the grid floor does not stress the refractory. The patent teaches a sealing system which can be used on vertical and horizontal surfaces, but which was not directly applicable to solving our problem, namely sealing surfaces which are neither vertical nor horizontal.

We developed a way to seal a cone or dome shaped surface to the top of an FCC regenerator vessel which minimizes thermal stress cracking of the cone or dome.

BRIEF SUMMARY OF THE INVENTION

Accordingly, the present invention provides a process for the fluidized catalytic cracking of heavy hydrocarbons to lighter, more valuable products by contacting said heavy feed with a source of hot regenerated cracking catalyst in a reactor to produce cracked products and spent catalyst which is regenerated in said regenerator, characterized by use of a catalyst regenerator comprising: a combustor having an inlet for spent catalyst from a cracking reactor, an inlet for combustion air, an inlet for receiving recycled regenerated catalyst and an outlet in an upper portion of said combustor comprising an internal cone; a riser communicating said combustor with a disengaging vessel, said riser being in axial alignment with said internal cone of said combustor and extending therefrom and in axial alignment with said disengaging vessel, said riser operatively connecting said combustor and said disengaging vessel and permitting transfer of catalyst and combustion gas from said combustor to said disengaging vessel; said disengaging vessel located above and in axial alignment with said riser and said combustor, said disengaging vessel having a bottom comprising said internal cone, said disengaging vessel comprising means for receiving a mixture of regenerated catalyst and combustion gas discharged from said riser and for separating said mixture into a regenerated catalyst bed located at said bottom of said disengaging vessel and a flue gas phase which is removed from said disengaging vessel; and wherein said disengaging vessel comprises a regenerated catalyst outlet means connective with said cracking reactor and a regenerated catalyst recycle means connecting with said combustor; said internal cone having a downwardly extending cylindrical skirt spaced from the sidewall of said regenerator vessel and defining a cylindrical annular space intermediate said internal cone and said sidewall, and wherein said cylindrical skirt is fastened to said regenerator vessel by a support means.

In another embodiment, the present invention provides a catalyst regenerator apparatus for the high efficiency regeneration of fluidized catalytic cracking catalyst in a vessel having a vessel sidewall and comprising: a combustor having an inlet for spent catalyst from a cracking reactor, an inlet for combustion air, an inlet for receiving recycled regenerated catalyst and an outlet in an upper portion of said combustor comprising an internal cone; a riser communicating said combustor with a disengaging vessel, said riser being in axial alignment with said internal cone of said combustor and extending therefrom and in axial alignment with said disengaging vessel, said riser operatively connecting said combustor and said disengaging vessel and permitting transfer of catalyst and combustion gas from said combustor to said disengaging vessel; said disengaging vessel located above and in axial alignment with said riser and said combustor, said disengaging vessel having a bottom comprising said internal cone, said disengaging vessel comprising means for receiving a mixture of regenerated catalyst and combustion gas discharged from said riser and for separating said mixture into a regenerated catalyst bed located at said bottom of said disengaging vessel and a flue gas phase which is removed from said disengaging vessel; and wherein said disengaging vessel comprises a regenerated catalyst outlet means connective with said cracking reactor and a regenerated catalyst recycle means connecting with said combustor; said internal cone having a downwardly extending cylindrical skirt spaced from the sidewall of said regenerator vessel and defining a cylindrical annular space intermediate said internal cone and said sidewall, and wherein said cylindrical skirt is fastened to said regenerator vessel by a support means.

DESCRIPTION OF THE PREFERRED EMBODIMENTS

Figure 1:
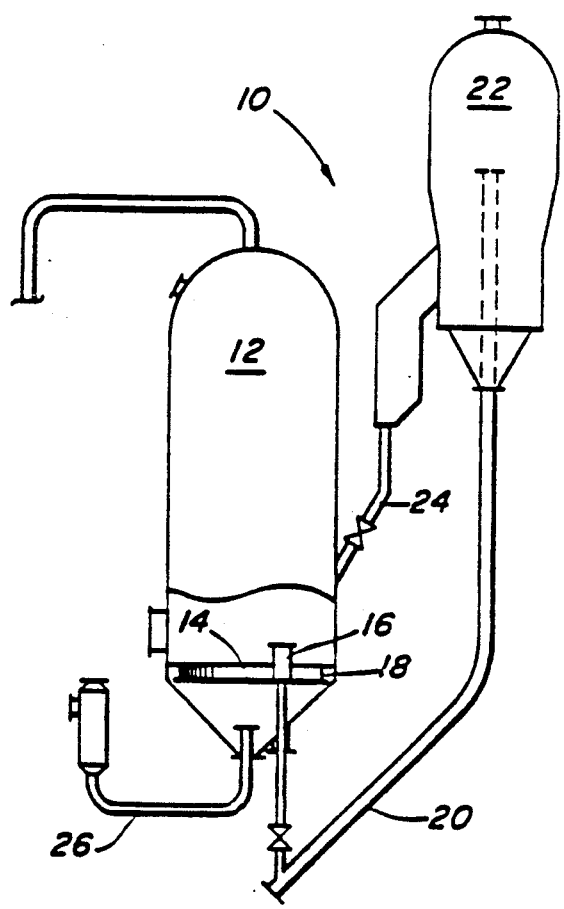
FIG. 1 (Prior Art) shows the general layout of an FCC unit with a bubbling bed regenerator.

In FIG. 1 (prior art) an FCC unit is shown generally as 10, with a regenerator vessel 12 having a perforated grid floor 14 in the lower portion thereof. A stand pipe 16 extends through grid floor 14, and seal 18 seals the grid floor to the interior wall of regenerator 12. Heavy feed and regenerated catalyst from standpipe 16 are combined in the base of riser 20, passed to reactor 22 and separated. Catalyst is stripped and passed via conduit 24 to regenerator 12. Air from line 26 passes through holes 28 in grid floor 14 and burns coke from the catalyst.

Figure 2:
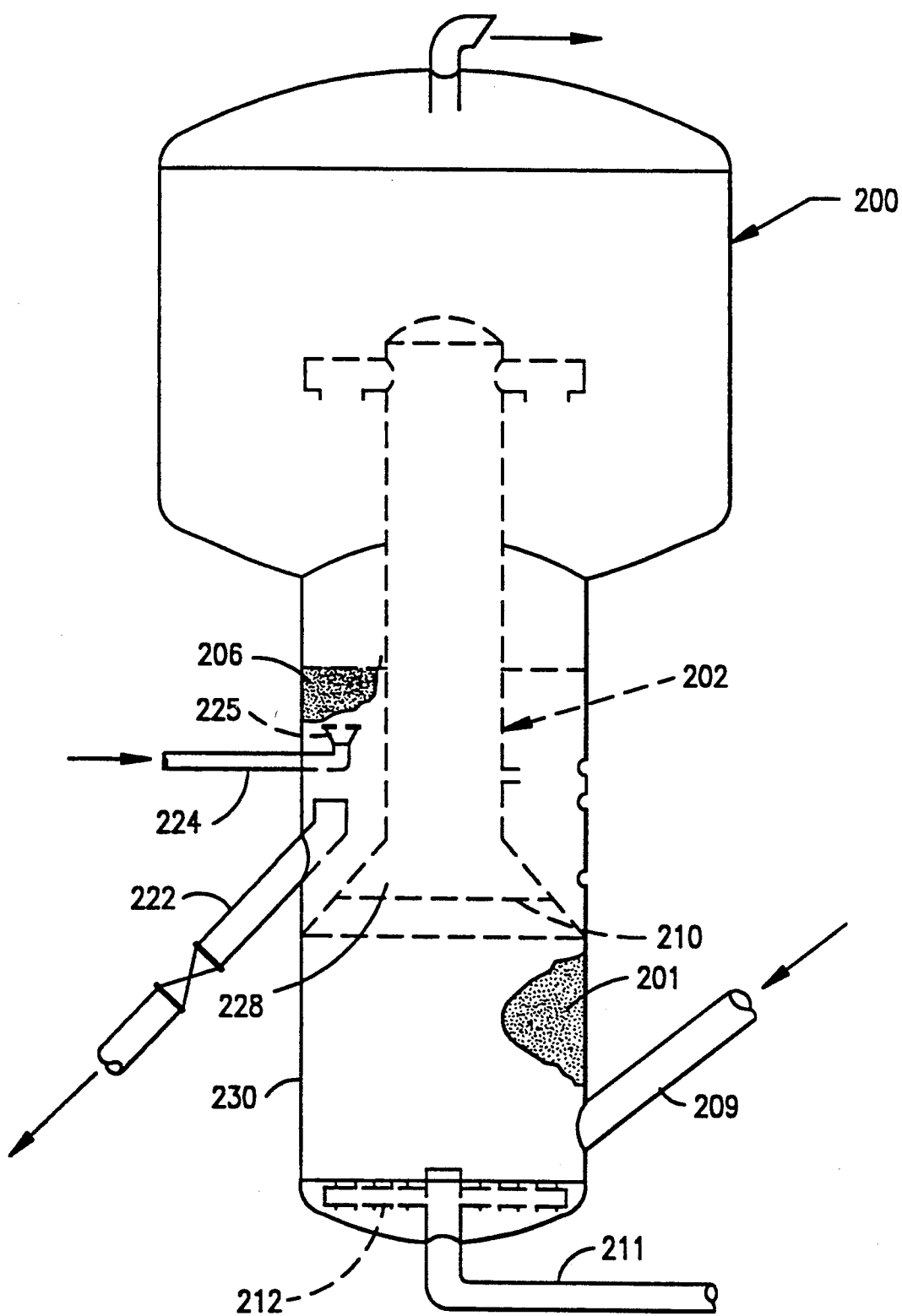
FIG. 2 (Prior Art) shows the general layout of an FCC unit with a high efficiency regenerator from FIG. 2 of U.S. Pat. No. 3,919,115.

FIG. 2 (prior art) is a simplified version of FIG. 2 of U.S. Pat. No. 3,919,115, which is incorporated herein by reference. This figure shows a high efficiency regenerator 200 comprising a fast fluidized bed coke combustor 201, a dilute phase transport riser 202 and a second dense bed 206. The transition section is shown as cone 228. It is the sealing of cone 228 to the generally cylindrical walls 230, which form the shell of the coke combustor and of the second dense bed, which is the problem solved by the present invention.

Figure 3:
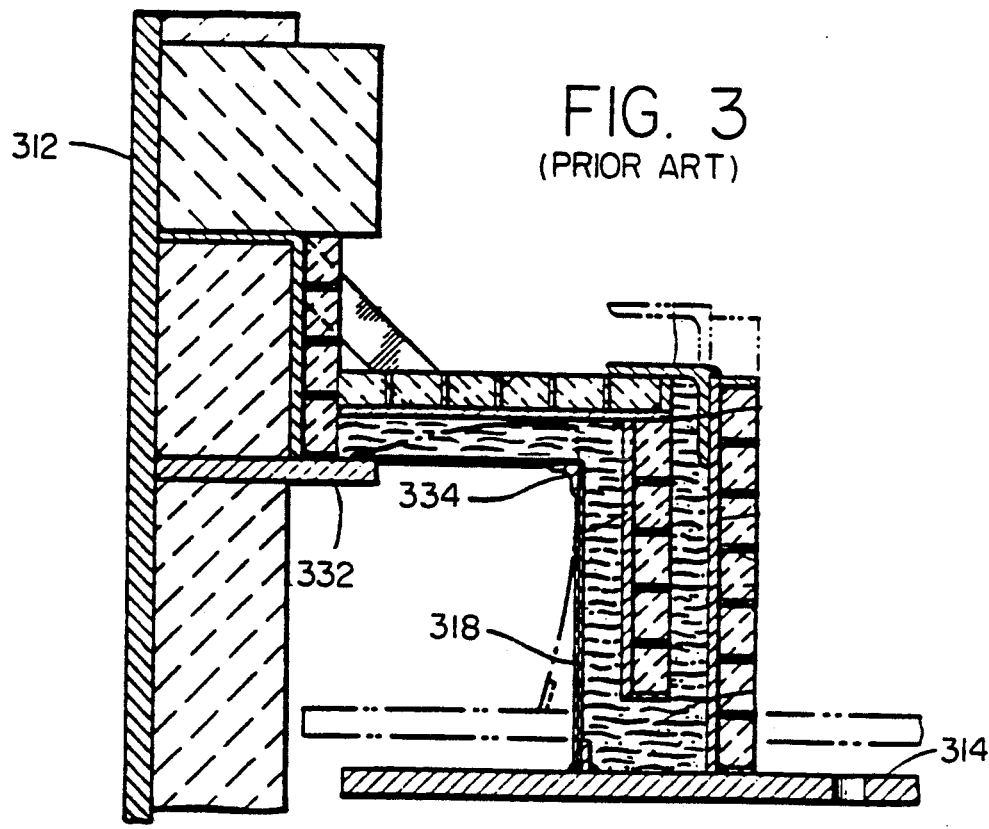
FIG. 3 (Prior Art) shows the membrane seal system of FIG. 3 of U.S. Pat. No. 4,493,816, which can be used in a bubbling bed regenerator.

FIG. 3 (Prior Art) is taken from FIG. 3 of U.S. Pat. No. 4,493,816. It shows a method of sealing a horizontal surface, such as floor 314, to the generally vertical walls 312 of an FCC regenerator. Grid seal 318 includes a vertically extending portion welded to grid floor 314 and a horizontally extending portion welded to support ring 332 which in turn is welded to the interior wall of regenerator 312. Grid seal 318 is preferably formed of thin metal membrane material and includes angle iron 334 joined to the vertical and horizontal portions of grid seal 318 to provided structural support.

When the FCC starts up, grid floor 314 expands and distorts a considerable amount as the regenerator reaches operating temperature. This causes distortion and movement of grid seal 318, as indicated by the broken lines in FIG. 3. Grid seal 318 must be thin and flexible to accommodate the expansion and distortion of grid floor 314.

U.S. Pat. No. 4,493,816 also teaches a sealing method which can be used to seal vertical surfaces such as standpipes, to generally horizontal surfaces, such as the grid floor. FIG. 5 of this patent shows such a vertical seal.

Figure 4:
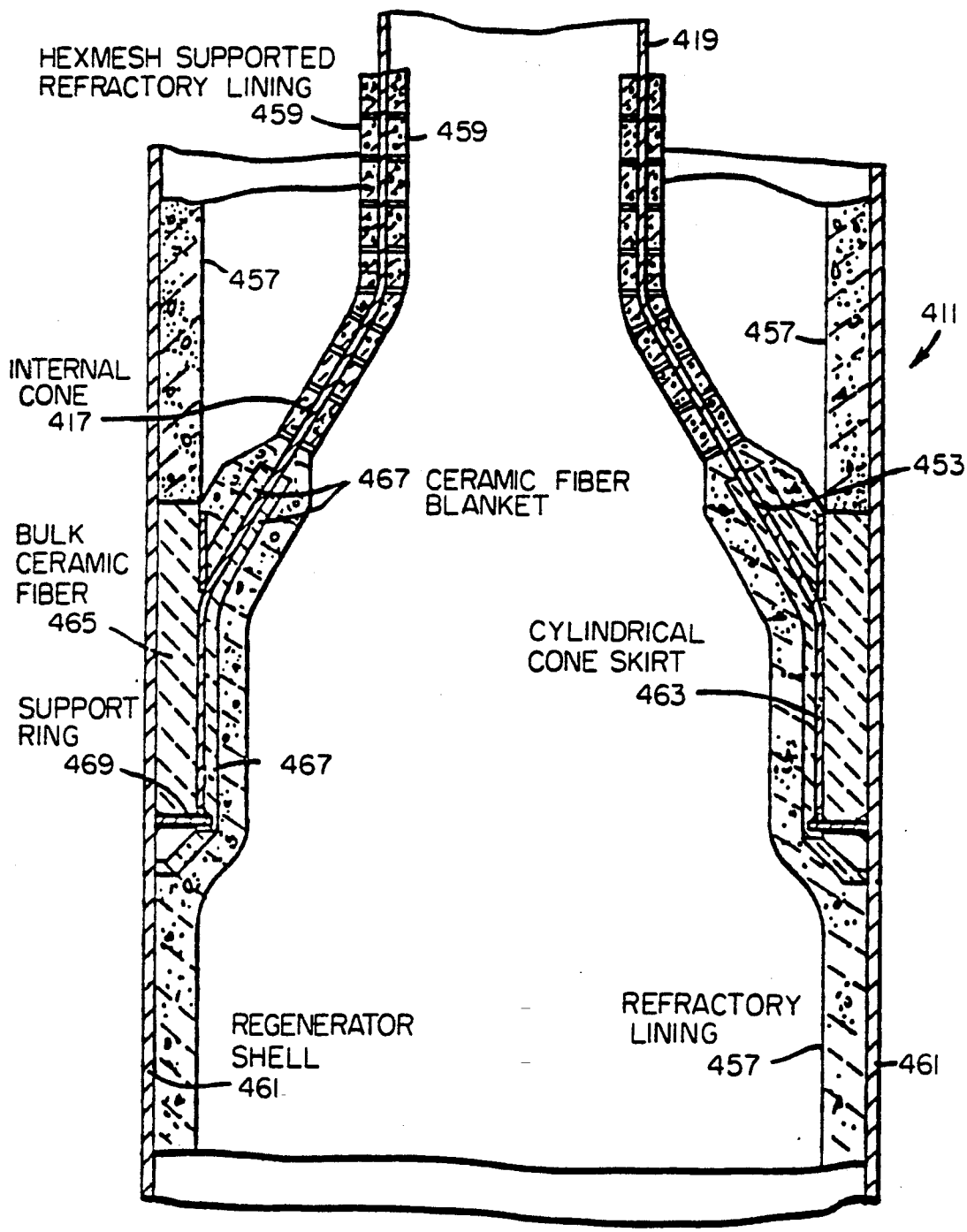
FIG. 4 (Invention) shows a side sectional view of a portion of a regenerator of the invention.

FIG. 4 (Invention) shows one way in which the process and apparatus of the invention may be used to solve the problem of overstressing of the cone. The general location of this portion of the regenerator corresponds roughly to lower portion of FIG. 2 (prior art) where cone 228 is attached to shell 230.

In FIG. 4, internal cone 417 in regenerator 411 comprises a cylindrical downwardly extending skirt 463. Internal cone 417 is mounted within regenerator 411 so that skirt 463 is spaced from the sidewall 461 by about 2" to 8". A support bar ring 469 is fastened to the internal periphery of the sidewall 461 and the cylindrical cone skirt 463 is fastened to the support ring 469. Bar ring 469 may be attached to sidewall 461, and to skirt 463 by conventional means, e.g., by welding.

The space between skirt 463 and sidewall or shell 461 is preferably filled with a commercially available bulk ceramic fiber layer 465, a thermally conductive material, or the space may be left void. The ceramic fiber, or the void space, insulates skirt 463 and conical portion 453 of the internal cone from sidewall 461 and permits some flexure of skirt 463 and associated conical portion 453. It is essential to have the downwardly extending skirt spaced from the sidewall of the regenerator vessel, but it is not essential to have any special kind of material filling the space. Either a fibrous, compressible material or a void space may be used.

It is preferred, but not essential, to provide some additional compressible material on at least some portions of the skirt and cone. Ceramic fiber blanket 467 is shown extending along the inner walls of the skirt and cone, and on the outer walls of the cone. This fibrous material provides additional insulation and room for expansion, both of which are believed to minimize thermally induced stresses in the cone.

A refractory lining 457 is provided through most the length of shell 461, both within the fast fluidized bed region, beneath internal cone 417, and in the bubbling dense bed region, above internal cone 417. This lining preferably covers the inner surface of cone skirt 463 and cone portion 453 and may also be on the outer surface of cone portion 453.

A hexmesh supported or other conventional refractory lining 459 is preferably provided along the inner and outer peripheral surfaces of the upper portion of cone portion 453 up the dilute phase transport riser 419.

When the regenerator shown in FIG. 4 is subjected to rapid temperature changes, the thermal stresses induced by the temperature changes are considerably reduced as compared to the stresses induced by the same temperature change in a high efficiency regenerator such as that of FIG. 2.

In the regenerator design of the invention, quite a lot of room is allowed for differential expansion between the internal cone and the regenerator vessel sidewall. Ceramic fiber may be used to insulate and isolate somewhat the second dense bed and dilute phase transport riser from the fast fluidized bed coke combustor. A void space, or thermally conductive material may be used if more heat transfer is desired. The void space may also permit some catalyst migration and accumulation in the void space. A good thermally conductive material is a knitted wire mesh, such as Yorkmesh demister pad.

We claim:

1. A catalyst regenerator apparatus for the high efficiency regeneration of fluidized catalytic cracking catalyst in a vessel having a vessel sidewall and comprising:
    a combustor having an inlet for spent catalyst from a cracking reactor, an inlet for combustion air, an inlet for receiving recycled regenerated catalyst and an outlet in an upper portion of said combustor comprising an internal cone;
    a riser communicating said combustor with a disengaging vessel, said riser being in axial alignment with said internal cone of said combustor and extending therefrom and in axial alignment with said disengaging vessel, said riser operatively connecting said combustor and said disengaging vessel and permitting transfer of catalyst and combustion gas from said combustor to said disengaging vessel;
    said disengaging vessel located above and in axial alignment with said riser and said combustor, said disengaging vessel having a bottom comprising said internal cone, said disengaging vessel comprising means for receiving a mixture of regenerated catalyst and combustion gas discharged from said riser and for separating said mixture into a regenerated catalyst bed located at said bottom of said disengaging vessel and a flue gas phase which is removed from said disengaging vessel; and wherein said disengaging vessel comprises a regenerated catalyst outlet means connective with said cracking reactor and a regenerated catalyst recycle means connecting with said combustor;
    said internal cone having a downwardly extending cylindrical skirt spaced from the sidewall of said regenerator vessel and defining a cylindrical annular space intermediate said internal cone and said sidewall, and wherein said cylindrical skirt is fastened to said regenerator vessel by a support means.

2. The apparatus of claim 1 further comprising an insulating material in said cylindrical annular space.

3. The apparatus of claim 1 further comprising a void in said cylindrical annular space.

4. The apparatus of claim 2 wherein said insulating material is a fibrous material.

5. The apparatus of claim 2 wherein said insulating material is a bulk ceramic fiber.

6. The apparatus of claim 1 further comprising a thermally conductive material in said cylindrical annular space.

7. The apparatus of claim 6 further comprising a knit wire mesh material as the thermally conductive material in said cylindrical annular space.

8. The apparatus of claim 1 wherein said support means comprises a bar ring attached to an inner periphery of said sidewall of said regenerator vessel and said cylindrical skirt is supported by said bar ring.

9. The apparatus of claim 1 wherein at least a portion of said cone is covered with a ceramic fiber blanket.

10. A process for the fluidized catalytic cracking of heavy hydrocarbons feed to lighter, more valuable products by contacting said heavy feed with a source of hot regenerated cracking catalyst in a reactor to produce cracked products and spent catalyst which is regenerated in said regenerator, characterized by use of a catalyst regenerator comprising:
    a combustor having an inlet for spent catalyst from a cracking reactor, an inlet for combustion air, an inlet for receiving recycled regenerated catalyst and an outlet in an upper portion of said combustor comprising an internal cone;
    a riser communicating said combustor with a disengaging vessel, said riser being in axial alignment with said internal cone of said combustor and extending therefrom and in axial alignment with said disengaging vessel, said riser operatively connecting said combustor and said disengaging vessel and permitting transfer of catalyst and combustion gas from said combustor to said disengaging vessel;
    said disengaging vessel located above and in axial alignment with said riser and said combustor, said disengaging vessel having a bottom comprising said internal cone, said disengaging vessel comprising means for receiving a mixture of regenerated catalyst and combustion gas discharged from said riser and for separating said mixture into a regenerated catalyst bed located at said bottom of said disengaging vessel and a flue gas phase which is removed from said disengaging vessel; and wherein said disengaging vessel comprises a regenerated catalyst outlet means connective with said cracking reactor and a regenerated catalyst recycle means connecting with said combustor;
    said internal cone having a downwardly extending cylindrical skirt spaced from the sidewall of said regenerator vessel and defining a cylindrical annular space intermediate said internal cone and said sidewall, and wherein said cylindrical skirt is fastened to said regenerator vessel by a support means.

* * * * *